United States Patent
Proudler et al.

(10) Patent No.: US 9,111,119 B2
(45) Date of Patent: Aug. 18, 2015

(54) METHODS, DEVICES AND DATA STRUCTURES FOR TRUSTED DATA

(71) Applicant: Hewlett-Packard Development Company, L.P., Houston, TX (US)

(72) Inventors: Graeme John Proudler, Bristol (GB); William Burton, Cheltenham (GB); Dirk Kuhlmann, Bristol (GB); David Plaquin, Bristol (GB)

(73) Assignee: HEWLETT-PACKARD DEVELOPMENT COMPANY L.P., Houston, TX (US)

( * ) Notice: Subject to any disclaimer, the term of this patent is extended or adjusted under 35 U.S.C. 154(b) by 211 days.

(21) Appl. No.: 13/779,400

(22) Filed: Feb. 27, 2013

(65) Prior Publication Data

US 2013/0239222 A1  Sep. 12, 2013

Related U.S. Application Data

(62) Division of application No. 11/908,920, filed as application No. PCT/GB2006/050063 on Mar. 22, 2006, now Pat. No. 8,539,587.

(51) Int. Cl.
*H04L 29/06* (2006.01)
*G06F 21/64* (2013.01)
*G06F 21/57* (2013.01)

(52) U.S. Cl.
CPC .............. *G06F 21/64* (2013.01); *G06F 21/57* (2013.01)

(58) Field of Classification Search
CPC .................................. G06F 21/64; G06F 21/57
USPC ............................................. 726/25; 713/187
See application file for complete search history.

(56) References Cited

U.S. PATENT DOCUMENTS

| | | | |
|---|---|---|---|
| 6,330,670 B1 | 12/2001 | England et al. | |
| 2002/0169717 A1 | 11/2002 | Challener | |
| 2003/0037231 A1 | 2/2003 | Goodman et al. | |
| 2003/0056102 A1 | 3/2003 | Aho | |
| 2003/0196083 A1 | 10/2003 | Grawrock | |
| 2003/0220882 A1* | 11/2003 | Rabin et al. | 705/57 |
| 2005/0033987 A1 | 2/2005 | Yan et al. | |
| 2006/0005000 A1 | 1/2006 | King et al. | |
| 2006/0026417 A1* | 2/2006 | Furusawa et al. | 713/2 |

FOREIGN PATENT DOCUMENTS

| | | |
|---|---|---|
| EP | 1182534 | 2/2002 |
| EP | 1282027 | 2/2003 |
| JP | 2004-013899 | 1/2004 |
| JP | 2004-280284 | 10/2004 |

OTHER PUBLICATIONS

Extended European Search Report for EP Application No. 09178175.7, May 11, 2010, 6 pps.

(Continued)

*Primary Examiner* — Justin T Darrow
(74) *Attorney, Agent, or Firm* — Hewlett-Packard Patent Department

(57) ABSTRACT

An apparatus includes a processor and a memory to implement a method to provide a proof that two or more instances of a data structure type are as trustworthy as each other.

18 Claims, 7 Drawing Sheets

(56) References Cited

OTHER PUBLICATIONS

Marchesini John et al., Open Source Applications of TCPA Hardware, 20th Annual Computer Security Applications Conference, Dec. 6-10, 2004, Tucson, AZ, 11 pps.

Reid, Jason et al., Privacy and Trusted Computing, Information Security Research Centre, Queensland University of Technology, 18 pps.

Trusted Computing Group et al., TCG Specification Architecture Overview. Specification Revision 1.2, Apr. 28, 2004, 54 pps.

* cited by examiner

METHODS, DEVICES AND DATA STRUCTURES FOR TRUSTED DATA

CLAIM FOR PRIORITY

The present application is a Divisional Application of U.S. patent application Ser. No. 11/908,920, filed on May 12, 2008, which is a U.S. National Stage of International Application No. PCT/GB2006/050063, filed on Mar. 22, 2006, the disclosures of which are incorporated by reference herein in their entirety.

FIELD OF INVENTION

The invention relates to data which is trusted, in the sense that at least one trusted entity is prepared to vouch for the data. It is particularly relevant to data comprising software (such as data structures or executable instructions) and in embodiments to the upgrading or replacement of software on a computing device.

BACKGROUND OF INVENTION

A significant consideration in interaction between computing entities is trust—whether a foreign computing entity will behave in a reliable and predictable manner, or will be (or already is) subject to subversion. Trusted systems which contain a component at least logically protected from subversion have been developed by the companies forming the Trusted Computing Group (TCG)—this body develops specifications in this area, such are discussed in, for example, "Trusted Computing Platforms—TCPA Technology in Context", edited by Siani Pearson, 2003, Prentice Hall PTR. The implicitly trusted components of a trusted system enable measurements of a trusted system and are then able to provide these in the form of integrity metrics to appropriate entities wishing to interact with the trusted system. The receiving entities are then able to determine from the consistency of the measured integrity metrics with known or expected values that the trusted system is operating as expected.

Integrity metrics will typically include measurements of the software used by the trusted system. These measurements may, typically in combination, be used to indicate states, or trusted states, of the trusted system. In Trusted Computing Group specifications, mechanisms are taught for "sealing" data to a particular platform state—this has the result of encrypting the sealed data into an inscrutable "opaque blob" containing a value derived at least in part from measurements of software on the platform. The measurements comprise digests of the software, because digest values will change on any modification to the software. This sealed data may only be recovered if the trusted component measures the current platform state and finds it to be represented by the same value as in the opaque blob.

It will be appreciated that any change in software will cause a number of problems, both with this specific process and more generally where measurement of software is taken as representative of the state of a computer system—however small the change to the software, effective forms of measurement (such as digests) will give different values. In the example of "sealing" above, this means that changes to software—which may be entirely desirable, for example to improve functionality or to remove bugs and weaknesses—have the disadvantage of preventing continued access to sealed data. This is only one exemplary problem, however—there is a general difficulty in having the same trust in new or replacement software as was had in original software, this general difficulty having attendant practical difficulties in maintaining functionality based on that trust.

It is desirable to find a way to update or change software that is trusted to provide continuity in trust as well as in software functionality.

SUMMARY OF INVENTION

In one aspect, the invention provides a data structure comprising an identification of a data structure type and a proof that two or more instances of the data structure type are as trustworthy as each other.

BRIEF DESCRIPTION OF THE DRAWINGS

Preferred embodiments of the invention will now be described, by way of example only, with reference to the accompanying drawings, of which.

DETAILED DESCRIPTION OF EMBODIMENTS OF THE INVENTION

Figure 1:
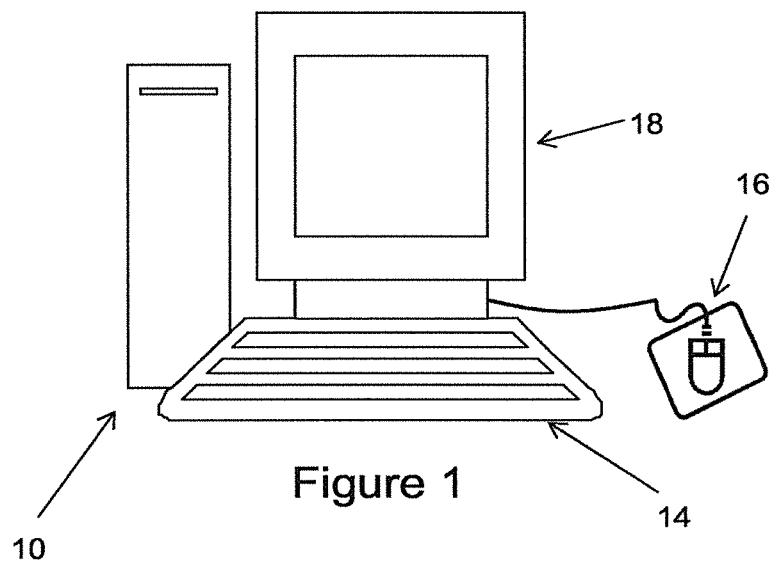
FIG. 1 is an illustration of an exemplary prior art computer platform suitable for use with embodiments of the invention.

Before describing embodiments of the present invention, a trusted computing platform of a type generally suitable for carrying out embodiments of the present invention will be described with relevance to FIGS. 1 to 4. This description of a trusted computing platform describes certain basic elements of its construction and operation. A "user", in this context, may be a remote user such as a remote computing entity. A trusted computing platform is further described in the applicant's International Patent Application No. PCT/GB00/00528 entitled "Trusted Computing Platform" and filed on 15

Feb. 2000, the contents of which are incorporated by reference herein. The skilled person will appreciate that the present invention does not rely for its operation on use of a trusted computing platform precisely as described below: embodiments of the present invention are described with respect to such a trusted computing platform, but the skilled version will appreciate that aspects of the present invention may be employed with different types of computer platform which need not employ all aspects of Trusted Computing Group trusted computing platform functionality.

A trusted computing platform of the kind described here is a computing platform into which is incorporated a trusted device whose function is to bind the identity of the platform to reliably measured data that provides one or more integrity metrics of the platform. The identity and the integrity metric are compared with expected values provided by a trusted party (TP) that is prepared to vouch for the trustworthiness of the platform. If there is a match, the implication is that at least part of the platform is operating correctly, depending on the scope of the integrity metric.

A user verifies the correct operation of the platform before exchanging other data with the platform. A user does this by requesting the trusted device to provide its identity and one or more integrity metrics. (Optionally the trusted device will refuse to provide evidence of identity if it itself was unable to verify correct operation of the platform.) The user receives the proof of identity and the identity metric or metrics, and compares them against values which it believes to be true. Those proper values are provided by the TP or another entity that is trusted by the user. If data reported by the trusted device is the same as that provided by the TP, the user trusts the platform. This is because the user trusts the entity. The entity trusts the platform because it has previously validated the identity and determined the proper integrity metric of the platform.

Once a user has established trusted operation of the platform, he exchanges other data with the platform. For a local user, the exchange might be by interacting with some software application running on the platform. For a remote user, the exchange might involve a secure transaction. In either case, the data exchanged is 'signed' by the trusted device. The user can then have greater confidence that data is being exchanged with a platform whose behaviour can be trusted. Data exchanged may be information relating to some or all of the software running on the computer platform. Existing Trusted Computing Group trusted computer platforms are adapted to provide digests of software on the platform—these can be compared with publicly available lists of known digests for known software. This does however provide an identification of specific software running on the trusted computing platform—this may be undesirable for the owner of the trusted computing platform on privacy grounds. As will be described below, aspects of the present invention may be used to improve this aspect of the privacy position of the trusted computing platform owner.

The trusted device uses cryptographic processes but does not necessarily provide an external interface to those cryptographic processes. The trusted device should be logically protected from other entities—including other parts of the platform of which it is itself a part. Also, a most desirable implementation would be to make the trusted device tamper-proof, to protect secrets by making them inaccessible to other platform functions and provide an environment that is substantially immune to unauthorised modification (ie, both physically and logically protected). Since tamper-proofing is impossible, the best approximation is a trusted device that is tamper-resistant, or tamper-detecting. The trusted device, therefore, preferably consists of one physical component that is tamper-resistant. Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected.

A trusted platform 10 is illustrated in the diagram in FIG. 1. The computer platform 10 is entirely conventional in appearance—it has associated the standard features of a keyboard 14, mouse 16 and visual display unit (VDU) 18, which provide the physical 'user interface' of the platform.

Figure 2:
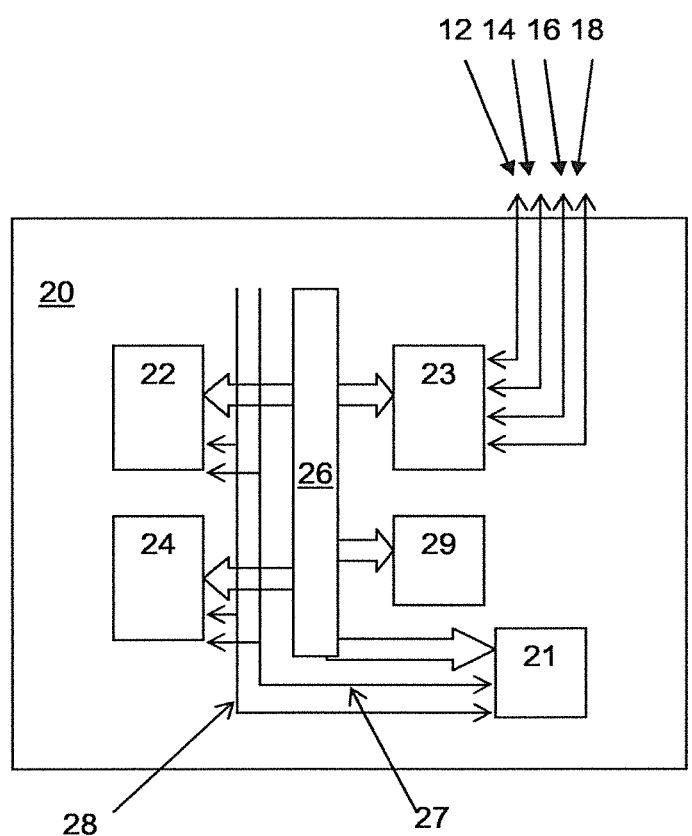
FIG. 2 indicates functional elements present on the motherboard of a prior art trusted computer platform suitable for use with embodiments of the invention.

As illustrated in FIG. 2, the motherboard 20 of the trusted computing platform 10 includes (among other standard components) a main processor 21, main memory 22, a trusted device 24, a data bus 26 and respective control lines 27 and lines 28, BIOS memory 29 containing the BIOS program for the platform 10 and an Input/Output (10) device 23, which controls interaction between the components of the motherboard and the keyboard 14, the mouse 16 and the VDU 18. The main memory 22 is typically random access memory (RAM). In operation, the platform 10 loads the operating system, for example Windows XP™, into RAM from hard disk (not shown). Additionally, in operation, the platform 10 loads the processes or applications that may be executed by the platform 10 into RAM from hard disk (not shown).

Typically, in a personal computer the BIOS program is located in a special reserved memory area, the upper 64K of the first megabyte of the system memory (addresses FØØØh to FFFFh), and the main processor is arranged to look at this memory location first, in accordance with an industry wide standard. A significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows XP™, which is typically loaded into main memory 212 from a hard disk drive (not shown). The main processor is initially controlled by the trusted device because it is necessary to place trust in the first measurement to be carried out on the trusted platform computing. The measuring agent for this first measurement is termed the root of trust of measurement (RTM) and is typically trusted at least in part because its provenance is trusted. In one practically useful implementation the RTM is the platform while the main processor is under control of the trusted device. As is briefly described below, one role of the RTM is to measure other measuring agents before these measuring agents are used and their measurements relied upon. The RTM is the basis for a chain of trust. Note that the RTM and subsequent measurement agents do not need to verify subsequent measurement agents, merely to measure and record them before they execute. This is called an "authenticated boot process". Valid measurement agents may be recognised by comparing a digest of a measurement agent against a list of digests of valid measurement agents. Unlisted measurement agents will not be recognised, and measurements made by them and subsequent measurement agents are suspect.

Figure 3:
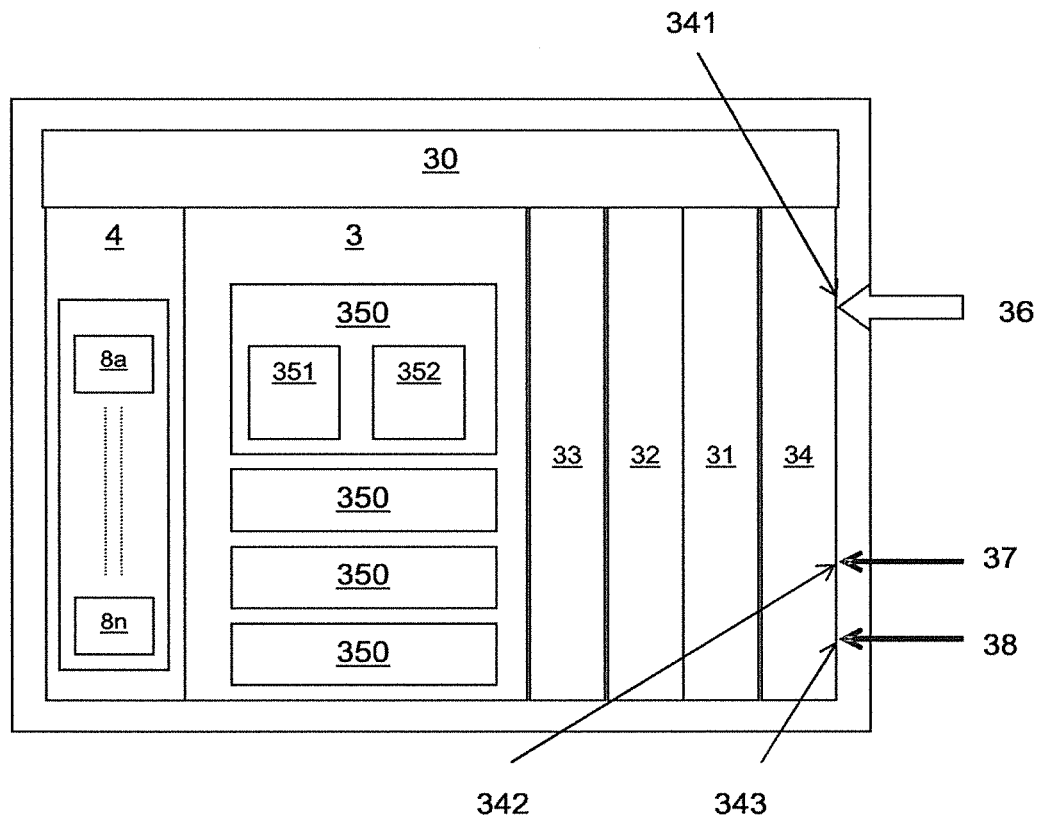
FIG. 3 indicates the functional elements of a trusted device of the trusted computer platform of FIG. 2 suitable for use with embodiments of the invention.
Figure 4:
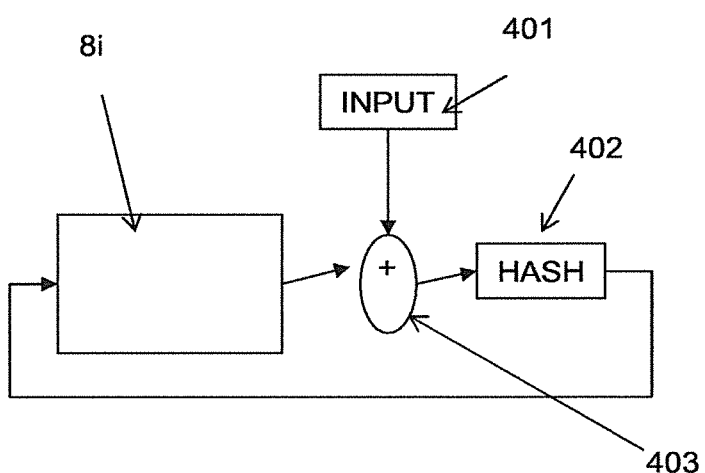
FIG. 4 illustrates the process of extending values into a platform configuration register of the trusted computer platform of FIG. 2 suitable for use with embodiments of the invention.

The trusted device 24 comprises a number of blocks, as illustrated in FIG. 3. After system reset, the trusted device 24 performs an authenticated boot process to ensure that the operating state of the platform 10 is recorded in a secure manner. During the authenticated boot process, the trusted device 24 acquires an integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface. In a particularly preferred arrangement, the display driver for the computing platform is located within the trusted device 24 with the result that a local user can trust the display of data provided by the trusted device 24 to the display—this is further described in the applicant's International Patent Application No. PCT/GB00/02005, entitled "System for Providing a Trustworthy User Interface" and filed on 25 May 2000, the contents of which are incorporated by reference herein.

Specifically, the trusted device in this embodiment comprises: a controller 30 programmed to control the overall operation of the trusted device 24, and interact with the other functions on the trusted device 24 and with the other devices on the motherboard 20; a measurement function 31 for acquiring a first integrity metric from the platform 10 either via direct measurement or alternatively indirectly via executable instructions to be executed on the platform's main processor; a cryptographic function 32 for signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. Additionally, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

One item of data stored in the non-volatile memory 3 of the trusted device 24 is a certificate 350. The certificate 350 contains at least a public key 351 of the trusted device 24 and an authenticated value 352 of the platform integrity metric measured by a trusted party (TP). The certificate 350 is signed by the TP using the TP's private key prior to it being stored in the trusted device 24. In later communications sessions, a user of the platform 10 can deduce that the public key belongs to a trusted device by verifying the TP's signature on the certificate. Also, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 35 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform 10 with which it is associated. In the present embodiment, a first integrity metric is acquired by the measurement function 31 in a process involving the generation of a digest of the BIOS instructions in the BIOS memory. Such an acquired integrity metric, if verified as described above, gives a potential user of the platform 10 a high level of confidence that the platform 10 has not been subverted at a hardware, or BIOS program, level. Other known processes, for example virus checkers, will typically be in place to check that the operating system and application program code has not been subverted.

The measurement function 31 has access to: non-volatile memory 3 for storing a hash program 354 and a private key 355 of the trusted device 24, and volatile memory 4 for storing acquired integrity metrics. A trusted device has limited memory, yet it may be desirable to store information relating to a large number of integrity metric measurements. This is done in trusted computing platforms as described by the Trusted Computing Group by the use of Platform Configuration Registers (PCRs) 8a-8n. The trusted device has a number of PCRs of fixed size (the same size as a digest)—on initialisation of the platform, these are set to a fixed initial value. Integrity metrics are then "extended" into PCRs by a process shown in FIG. 4. The PCR 8i value is concatenated 403 with the input 401 which is the value of the integrity metric to be extended into the PCR. The concatenation is then hashed 402 to form a new 160 bit value. This hash is fed back into the PCR to form its new value. In addition to the extension of the integrity metric into the PCR, to provide a clear history of measurements carried out the measurement process may also be recorded in a conventional log file (which may be simply in main memory of the computer platform). For trust purposes, however, it is the PCR value that will be relied on and not the software log.

Clearly, there are a number of different ways in which an initial integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. As indicated above, a large number of integrity metrics may be collected by measuring agents directly or indirectly measured by the RTM, and these integrity metrics extended into the PCRs of the trusted device 24. Some—many—of these integrity metrics will relate to the software state of the trusted platform.

Preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked. Optionally, after receiving the computed BIOS digest, the trusted device 24 may inspect the proper value of the BIOS digest in the certificate and not pass control to the BIOS if the computed digest does not match the proper value—an appropriate exception handling routine may be invoked.

Processes of trusted computing platform manufacture and verification by a third party are briefly described, but are not of fundamental significance to the present invention and are discussed in more detail in "Trusted Computing Platforms—TCPA Technology in Context" identified above.

At the first instance (which may be on manufacture), a TP which vouches for trusted platforms, will inspect the type of the platform to decide whether to vouch for it or not. The TP will sign a certificate related to the trusted device identity and to the results of inspection—this is then written to the trusted device.

At some later point during operation of the platform, for example when it is switched on or reset, the trusted device 24 acquires and stores the integrity metrics of the platform. When a user wishes to communicate with the platform, he uses a challenge/response routine to challenge the trusted device 24 (the operating system of the platform, or an appropriate software application, is arranged to recognise the challenge and pass it to the trusted device 24, typically via a BIOS-type call, in an appropriate fashion). The trusted device 24 receives the challenge and creates an appropriate response based on the measured integrity metric or metrics—this may be provided with the certificate and signed. This provides sufficient information to allow verification by the user.

Values held by the PCRs may be used as an indication of trusted platform state. Different PCRs may be assigned specific purposes (this is done, for example, in Trusted Computing Group specifications). A trusted device may be requested to provide values for some or all of its PCRs (in practice a digest of these values—by a TPM_Quote command) and sign these values. As indicated above, data (typically keys or passwords) may be sealed (by a TPM_Seal command) against a digest of the values of some or all the PCRs into an opaque blob. This is to ensure that the sealed data can only be used if the platform is in the (trusted) state represented by the PCRs. The corresponding TPM_Unseal command performs the same digest on the current values of the PCRs. If the new digest is not the same as the digest in the opaque blob, then the user cannot recover the data by the TPM_Unseal command. If any of the measurements from which the PCR values are derived relate to software on the platform which has changed, then the corresponding PCR will have a different value—a conventional trusted platform will therefore not be able to recover the sealed data.

Aspects of the present invention will now be described with reference to embodiments employing—in some cases modifying—the trusted computing platform structure indicated above. An approach to providing new or updated software of equivalent function and trust properties will first be described, together with a mechanism for allowing a trusted computing platform to indicate its software functionality—and verify its trusted status—without revealing the specific software that it uses. An exemplary approach is described to demonstrate how PCR values before and after replacement of software with functionally and trust equivalent software can be shown to be equivalent, and the use of this approach to solve problems such as that indicated above in sealing data against a software state.

It is noted that in existing trusted computing platform arrangements, entities in fact base their confidence in a trusted computing platform on signed statements about the software that is installed in a platform. The inventor has appreciated that trusted platforms may provide evidence of verification of statements that the software is to be trusted, rather than providing the actual software measurements. This has several advantages. If the trusted device no longer holds values of software measurements, it is physically impossible for the trusted device to report the values of software measurements. If the verification process can include evidence of the trust equivalence of two values of software measurements (and the statement was made by a trusted measurement entity), the trusted device will contain information that can be used (as is described below, in an exemplary arrangement) to re-enable access to sealed plain text data after software is changed in a prescribed manner.

Positive consequences follow from working from statements that vouch for the software in a platform, instead of with the actual software in a platform. If a party that vouched for existing software is prepared to vouch that replacement software is just as acceptable as existing software, use of appropriate statements for this purpose can be used such that the platform can re-enable access to sealed plain text data after such replacement software is installed. In practice the owner of a trusted platform must choose the parties that he wishes to vouch for his platform. The owner could choose any party or set of parties, provided that that party or parties has credibility with those who will interact with the platform. The owner can change parties or sets of parties, provided that those parties are willing to acknowledge each other as trusted peers. This enables both commercial companies and not-for-profit organisations to vouch for the same trusted platforms.

Figure 5:
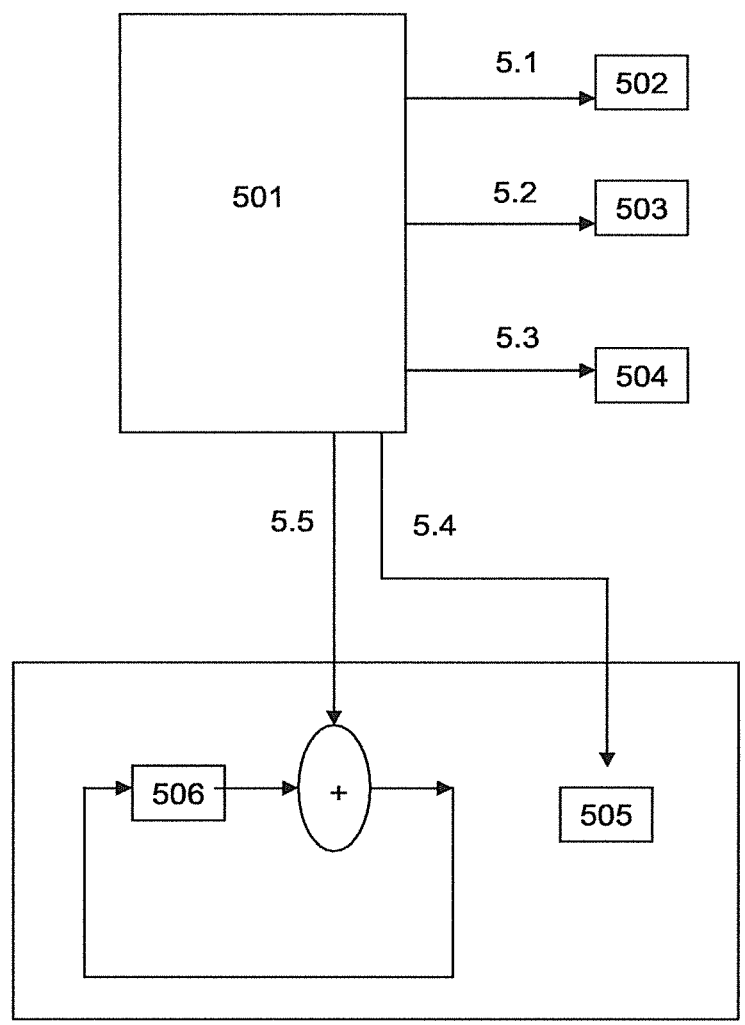
FIG. 5 illustrates a process of recording integrity metrics in accordance with embodiments of the invention

FIG. 5 illustrates significant steps in the process of making measurements and recording them in a TPM 507, according to embodiments of the present invention. In step 5.1, the Root-of-Trust-for-Measurement (RTM) or measurement agent 501 makes a digest of a digital object 502. In step 5.2, the RTM or measurement agent 501 reads the verification statements 503 associated with the digital object 502. In step 5.3, the RTM or measurement agent 501 writes a log 504 describing the digital object 502 and its verification statements 503. In step 5.4, the RTM or measurement agent 501 verifies the verification statements 503 and records any failure in a flag 505 associated with the PCR 506. In step 5.5, the RTM or measurement agent 501 records an unambiguous indication of the verification process 503 in the PCR 506.

Figure 6:
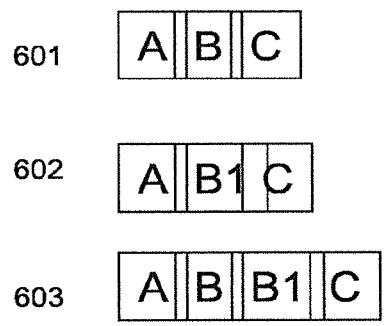
FIG. 6 illustrates two trust equivalent sets of integrity metrics and the embodiment of the second set in accordance with embodiments of the invention.

FIG. 6 illustrates two sets 601 602 of integrity metrics (the second representing a software state that is trust equivalent to a software state represented by the first), plus a third set 603 that is the version of the second set 602 as used in this embodiment of the invention. The first set of integrity metrics 601 consists of three integrity metrics, labelled A, B and C. The second set of integrity metrics 602 also consists of three integrity metrics, labelled A, B1, C. The metrics A and C in the first set 601 are the same as the metrics A and C in the second set 602. The second set 602 is trust equivalent to the first set 601 if the software represented by integrity metric B1 is trust equivalent to the software represented by integrity metric B. The third set of integrity metrics 603 illustrates the integrity metrics A, B, B1, C that, according to this embodiment of the invention, must be recorded in order to permit a platform state generated by software A,B1,C to be recognised as trust equivalent to the platform state generated by software A,B,C.

A party produces a signed statement if it wishes to vouch for a particular program. The party creates a new statement if the program is not an upgrade or replacement, or creates the next entry in a list of statements if the program is an upgrade or replacement. A statement can describe one or more programs. If a statement describes more than one program, the implication is that all the programs are considered by the signing party to be equally functional and trustworthy for the intended task.

Figures 7, 9:
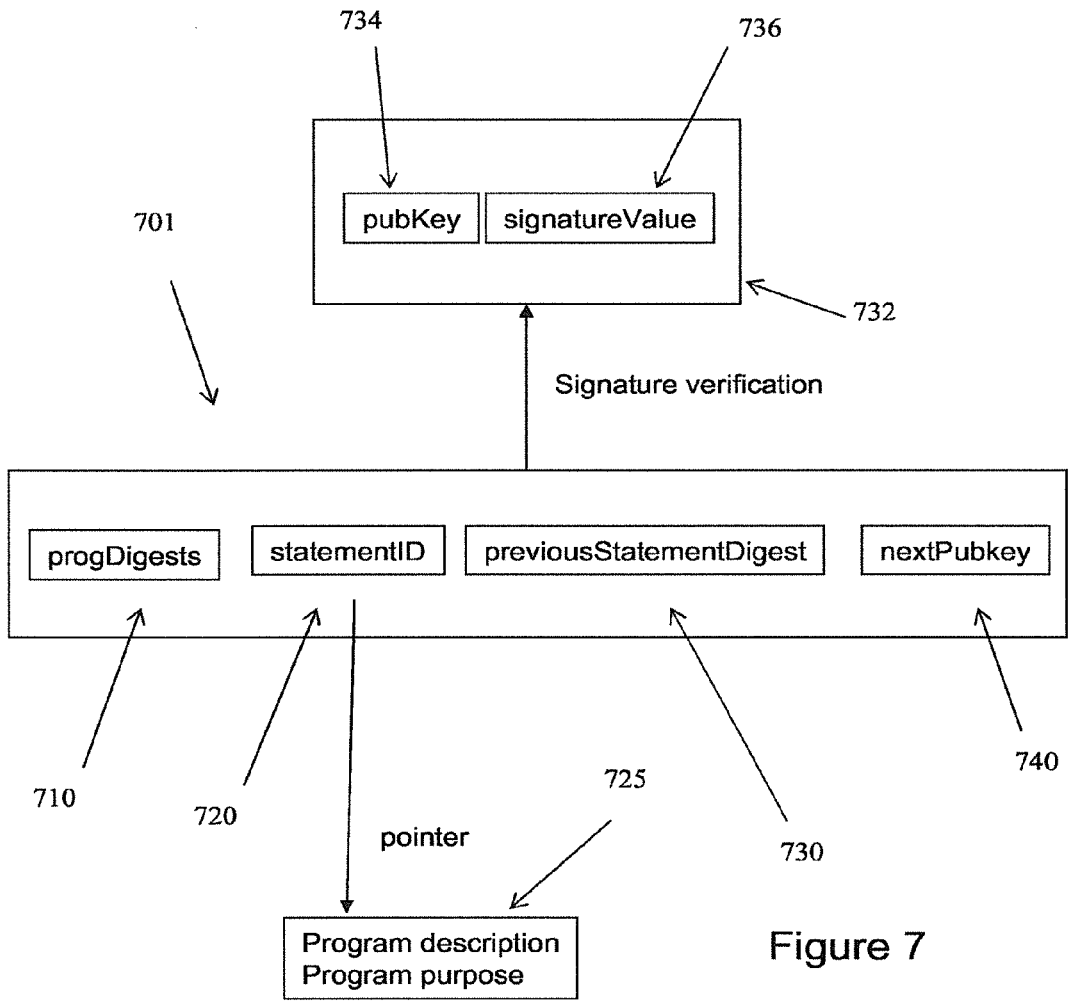
FIG. 7 illustrates a statement to vouch for new or replacement software in accordance with embodiments of the invention.
FIG. 9 illustrates a privacy enhancing version of statements of the type shown in FIG. 8 in accordance with embodiments of the invention.

An exemplary form of statement is shown in FIG. 7. A statement 701 has the structure [programDigestsN, statementID_N, prevStatementDigestN, nextPubKeyN] and has ancillary structures 732 [pubKeyN] (734) and [signatureValueN] (736). The fields pubKey and statement ID are sufficient to unambiguously identify the verification process implied in a statement. The elements of statement 701 will now be described.

programDigests 710 is the digest of the program that is vouched for by the statement. This need not be a digest of a single program—it may consist of a structure containing digests of more than one program that is vouched for by the statement. It may even be a digest of a structure containing digests of more than one program that is vouched for by the statement. Clearly, in such an implementation, the actual digests must also be available to the platform. As is discussed below, there may be privacy advantages to the user of multiple programs being referred to in programDigests.

statementID 720 is a tag, enabling identification of a description of the statement's purpose. That description could include a description of the program(s), the intended use of the program(s), the effect of the program(s), another information about the program(s), and a random number or other number. statementID serves to distinguish the statement from any other data signed with the same key.

If a program is not an upgrade to or replacement of another program, prevStatementDigest 730 is NULL and pubKey is the key that should be used to verify signature Value. However, if a program is an upgrade to or replacement of an existing program, prevStatementDigest is the digest of that previous statement, and nextPubKey 740 from that previous statement is the key that should be used to verify signatureValue. In other words, nextPubKey in one statement is the pubKey that must be used in the next statement.

Figure 8:
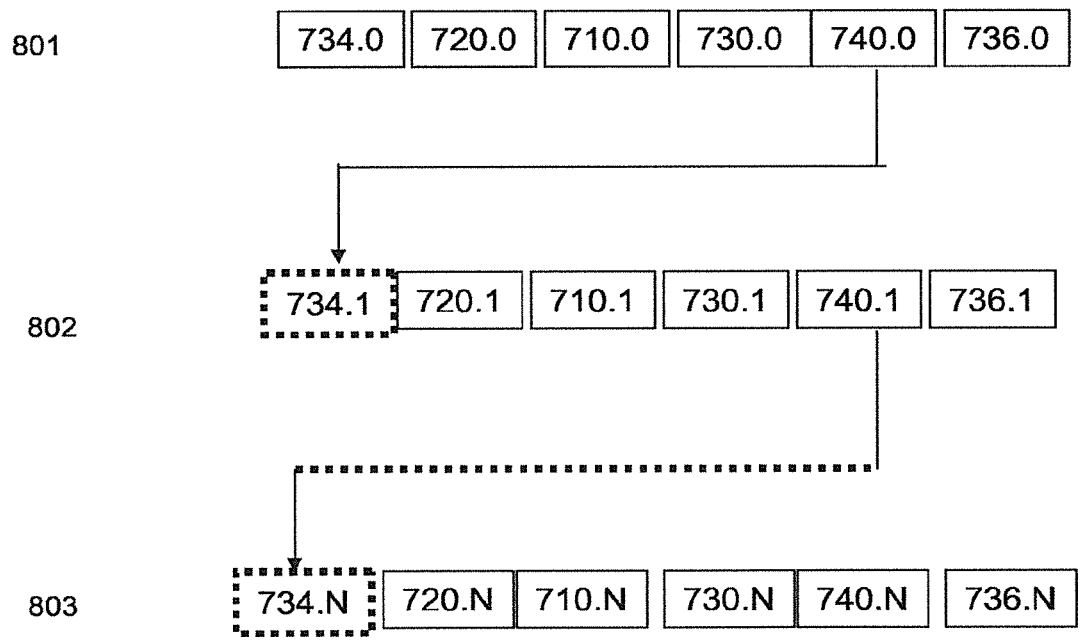
FIG. 8 shows a linked list of statements of the type shown in FIG. 5 in accordance with embodiments of the invention.

It can be seen that nextPubKey and prevStatement between them allow related statements to form a list linked both backwards and forwards—such linkage is illustrated in FIG. 8. A list of such statements 801 802 803 is linked forwards by means of signature values using the private keys corresponding to pubKey0 734.0, nextPubKey0 740.0, nextPubKey1 740.1, . . . nextPubKeyN 740.N. The list is linked backwards by means of prevStatementDigest1 730.1, . . . prevStatementDigestN 730.N. Each member of a list is linked to a program or programs by means of a signature value 736.0 736.1 736.N over data that includes programDigests 710.0 710.1 710.N.

In one approach illustrated in FIG. 8, a list of statements starts with pubKey0 734.0, followed by [statementID_0 720.0, programDigests0 710.0, NULL 730.0, nextPubKey0 740.0] and [signatureValue0 736.0], which is the result of signing [statementID_0 720.0, programDigests0 710.0, NULL 730.1, nextPubKey0 740.0] with the private key corresponding to pubKey0 734.0. The list continues with [statementID_1 720.1, programDigests1 710.1, prevStatementDigest1 730.1, nextPubKey1 740.1] and [signatureValue1 736.1], which is the result of signing [statementID_1 720.1, programDigests1 710.1, prevStatementDigest1 730.1, nextPubKey1 740.1] with the private key corresponding to nextPubKey0 740.0. The list continues in the same fashion.

The arrows in FIG. 8 illustrate that nextPubKey0 740.0 is the same as pubKey1 734.1, nextPubKey1 740.1 is the same as pubKeyN 734.N, and so on.

It should be appreciated that the statements in the list have in common equivalence of function and common evidence of trust by the party issuing the statement, but that in other aspects, statements can differ. For example, a program associated with statementN is not necessarily the program associated with statementM; thus programDigestsN is not necessarily the same as programDigestsM. This means that the program(s) associated with a statement at the start of a list may be different (or the same) as the program(s) associated with the statement at any intermediate point in the list, or at the end of the list. Similarly, pubKeyN in a list may or may not be the same as nextPubKeyN. Thus the key used to verify signatureValue0 may or may not be the same key used to verify signatureValueN, whether N is an intermediate statement in a list or is the last statement in a list. Thus a party may change its signing key at intervals (in accordance with recommended security practice) or may hand over trust to another party which has a different signing key.

In a modification to this approach, PubKey and nextPubKey could be digests of keys, or digests of a structure containing one or more keys. Clearly, in such an implementation, the actual public key must also be available to the platform. In such a case, any private key corresponding to any public key digest in that structure can be used to sign statements, and multiple parties can concurrently vouch for the trustworthiness of a platform.

It should be noted that for a given software type, it is necessary either to use statements of this type consistently or not to use them at all (and instead to use, for example, conventional TCG approaches). If statements are to be used for a software type, the first instance of the software type to be vouched for by the platform needs to have a statement. Switching from a conventional TCG approach to an upgrade with a statement, as described, is not an available approach.

A mechanism which allows a trusted platform to achieve a measure of privacy when asked to identify its software will now be described. This requires the party issuing a statement to actually issue two statements, the one described above plus a similar auxiliary statement that omits the programDigests field. FIG. 9 illustrates that an auxiliary statement 910 consists of the fields pubKey 734, StatementID 720, prevStatementDigest 730, nextPubKey 740, signatureValue 736 and lacks a programDigests field 710. These auxiliary statements might be returned to a challenger who receives signed integrity metrics from a trusted device instead of the main statements described previously. These auxiliary statements can prevent identification of the actual programs installed in the platform. If the programDigests field in the main statement describes just one program, it certainly identifies the program being used by the platform—there is thus a clear privacy advantage if the auxiliary statement should be used in a challenge response. Even if the programDigests field describes a few programs, it may be considered to reveal too much information about the platform, and the auxiliary statement should be used in a challenge response if privacy is required. Only when the programDigests field describes many programs is use of a main statement in a challenge response obviously irrelevant to privacy. The public key used to verify the main statement must also be that used to verify the auxiliary statement, and the same statementID should appear in both statements. These constraints are necessary to provide a verifiable connection between a main statement and an auxiliary statement. Naturally, the signature value for a main statement will differ from that of an auxiliary statement.

The verification of new or replacement software associated with statements will now be described, as will be the recording of the verification process. The essence of this process is to replace a single extend operation (for an aspect of a platform) with one or more extend operations, each of which describe a statement about that aspect of a platform.

For verification to be carried out and recorded, the following are required: that trusted measurement agents carry out the statement verification processes, and that a trusted measurement entity must verify programs, must verify statements, and must verify that lists of statements are fully linked. A measurement entity is trusted either because of attestation about the entity or measurements of the entity by a trusted measurement agent.

In order to verify a program, the measurement entity creates a digest of the program and compares that digest with information (from the field programDigests) in a statement. The measurement entity must record an indication of whether this process succeeded. One implementation is to record in the trusted device a verifiedProgram flag that is either TRUE or FALSE. If the program is associated with a linked list, this comparison should be done only using the last statement in the list. (Previous statements in the list merely provide a history of the evolution of the program and attestation for the program).

In order to create a verifiable record of a statement, the measurement entity must make a record in the trusted device of at least whether the signature of the statement was successfully verified. One implementation is to record in a trusted device a verifiedStatement flag that is set to either TRUE or FALSE.

In order to create an auditable record of the verification of a statement, the measurement agent must make a record of the technique used to perform the verification. One implementation is to record in the trusted device the public key (pubKey or nextPubKey) used to verify the signature over a statement. If practicable, the measurement agent also verifies that the public key used to verify the signature over statement is extant (has not been revoked), but this is probably beyond the capabilities of most measurement agents. Should it be possible to determine this, the measurement entity always sets the verifiedStatement flag to FALSE if the public key is not extant.

If the private key corresponding to a public key is only used to sign a single type of statement, no statement about the intent of the signature is required. Otherwise, information that indicates that the signature belongs to a particular statement must be recorded with the public key. One implementation is to record in the trusted device the statementID.

In order to distinguish a single statement or the start of a list, one implementation is to tag the verification of a statement with the flag startStatemen=TRUE if the statement was not verified using nextPubKey of another statement or if the statement's prevStatementDigest is not the digest value of the previous statement, and otherwise to tag the verification of a statement with the flag startStatement=FALSE.

Any member of a linked list must be verified both forwards and backwards. If a linking test passes, the statement is tagged with the flag verifiedList=TRUE. Otherwise the statement is tagged with the flag verifiedList=FALSE.

In order to create a complete record of a list of verified statements, the measurement entity must record in the trusted device at least the essential characteristics of all statements in the list, and whether all the statements in the list passed their verification tests. The preferred implementation is to make a record in the trusted device of all statements in the list, while recording separately in the trusted device the results of verification tests on every statement in the list.

Following this approach, after assessing a statement, the measurement entity may record in the trusted device at least the data structure STATEMENT_VERIFICATION containing at least (1) the public key used to verify the statement, (2) the statementID if it exists. For each PCR, the trusted device maintains an upgradesPermitted flag that is set TRUE on PCR initialisation but reset FALSE whenever the platform encounters a statement associated with that PCR with verifiedProgram=FALSE, or verifiedStatement=FALSE, or verifiedList=FALSE. If upgradesPermitted is FALSE, the information content of the associated PCR is unreliable. If upgradesPermitted is FALSE, the trusted device (TPM) must refuse to perform security operations predicated upon the correctness of that PCR value, such as sealing data to that PCR (e.g. creating TCG's "digestAtCreation" parameter), unsealing data (e.g. checking TCG's "digestAtRelease" parameter). If upgradesPermitted is FALSE, the TPM may refuse to report (using TPM_quote, for example) that PCR value, or alternatively may report the value of upgradesPermitted along with the PCR value.

An algorithm to substitute a conventional TCG integrity metric with a record of a statement or a record of a list of statements is described:

A measurement entity (prior to loading a program) initially follows normal TCG procedure by creating a digest of the program. The measuring entity then determines whether one or more statements are associated with the program.

If no statements are associated with the program, the measurement entity follows existing TCG procedure by extending the program's digest into the trusted device using TPM_Extend.

If statements are associated with the program, the measurement entity must parse the statements into single statements and chains of statements. When a single statement is identified, the appropriate flags and STATEMENT_VERIFICATION must be recorded in a trusted device (but note that the appropriate verifiedList is not recorded and need not even be computed). When the start or intermediate link of a chain is identified, the appropriate STATEMENT_VERIFICATION and flags are recorded in the trusted device (but note that the appropriate verifiedProgram flag is not recorded, and need not even be computed). When the end of a chain is identified, the appropriate STATEMENT_VERIFICATION structure and flags are recorded in the trusted device. Some algorithms for use while parsing statements are: (a) Always compute verifiedStatement; (b) Compute verifiedList if there is a previous and/or following statement; (c) Compute verifiedProgram if (there is no following statement) or if (following statement has startStatement=TRUE); (d) Always record STATEMENT_VERIFICATION; (e) Whenever verifiedProgram=FALSE, or verifiedStatement=FALSE, or verifiedList=FALSE, reset the appropriate upgradesPermitted flag.

The verification process described above captures the information needed to establish that upgraded or replacement software is trust equivalent to earlier software The privacy concerns associated with reporting software state on challenge can thus be ameliorated by the use of statements describing many programs or by the use of auxiliary statements. Further steps are required to solve the problem of accessing data in opaque blobs sealed to an earlier platform state with earlier software. As will be indicated below, it will be possible to reseal these opaque blobs to the PCR values associated with the new software state. This requires a number of actions, effectively amounting to proof that the later PCR values are derived legitimately from the earlier PCR values against which the opaque blob is sealed. Four types of action are required: proving that one PCR value can be derived from another PCR value; proving that one integrity metric is a replacement for another integrity metric (proving that the two integrity metrics are linked); proving the equivalence of PCR values composed of measured digests; and proving the equivalence of composite PCR values composed of multiple PCR values. Each action builds on preceding actions, and each action will be described below in turn in an exemplary embodiment, proposing new functions to complement the existing Trusted Computing Group system. The use of the functions will be described in an exemplary embodiment of the replacement of a first composite-PCR value in an opaque sealed blob with a second composite-PCR value that is trust equivalent to the first composite-PCR value.

It should be noted that in Trusted Computing Group terminology, sets of PCR values are described as TPM_COMPOSITE_HASH values. Trusted Computing Group defines a TPM_COMPOSITE_HASH value as the digest of a TPM_PCR_COMPOSITE structure, which is defined as:

```
typedef struct tdTPM_PCR_COMPOSITE {
    TPM_PCR_SELECTION select;
    UINT32 valueSize;
    [size_is(valueSize)] TPM_PCRVALUE pcrValue[ ];
} TPM_PCR_COMPOSITE;
```

This means that a TPM_PCR_COMPOSITE structure is (in essence) a TPM_PCR_SELECTION structure followed by a four Byte value, followed by a concatenated number of PCR values. A TPM_COMPOSITE_HASH value is the result of serially hashing those structures in a hash algorithm.

A particular nomenclature is used later in this specification when describing integrity metrics and PCR values. Capital letters represent integrity metric values and capital letters followed by the tilde character "~" represent PCR values, where the capital letter is that representing the most recent value of integrity metric to be extended into the PCR. Thus the PCR state A~ means that the most recent integrity metric extended into the PCR had the value A. The operation of extending a PCR value of A~ with the integrity metric value B is written X(A~, B), resulting in the PCR value B~. It must be appreciated that the PCR value represented by [letter]~ is multivalued. The actual PCR value depends on the previous history of the PCR.

The approach used throughout this exemplary implementation is for a management program to guide the trusted device (TPM) through a series of steps, each creating data that is evidence of an assertion that the trusted device has verified. (There are alternate ways to achieve the same objective involving checking by the trusted device of signed statements, but the described approach is selected for consistency with existing Trusted Computing Group methodology.) The trusted device can later recognise that it created such evidence. These recognition methods are well known to those skilled in the art, and are used in existing Trusted Computing Group technology. Recognition enables the TPM to believe the assertions stated in data when the data is reloaded into the TPM.

In one implementation, a trusted device requires new capabilities to prove that two sets of PCR values are trust equivalent. The following set of prototype trusted device commands illustrate the concept:

TPM_upgrade_extend(A~, B) produces evidence that one PCR value can be derived from another PCR value. The command produces output data [Uextend, A~, B~, B] as evidence that the PCR value B~ can be derived from the PCR value A~, and that the most recently extended integrity metric had the value B. To produce this evidence, the TPM loads a temporary PCR with the value A~ and extends it using the integrity metric B, producing the PCR value B~. The trusted device tags the output data with the string "Uextend" to show the type of evidence. After the trusted device has outputted the data, the temporary PCR can be discarded.

TPM_upgrade_concat([Uextend, A~, B~, B], [Uextend, B~, C~, C]) produces evidence that one PCR value can be derived from another PCR value. It produces output data [Uextend, A~, C~, C] as evidence that the PCR value C~ can be produced from the PCR value A~, and that the most recently extended integrity metric had the value C. To produce this evidence, the TPM is loaded with the data structures [Uextend, A~, B~, B] and [Uextend, B~, C~, C] and verifies: (1) that it created both structures; (2) that both [Uextend, A~, B~, B] and [Uextend, B~, C~, C] contain the string Uextend; (3) that the value of B in [Uextend, A~, B~, B] is the same value as B in [Uextend, B~, C~, C]. The trusted device tags the output data with the string "Uextend" to show the type of evidence.

TPM_upgrade_link(SA, SB) produces evidence that one integrity metric is trust equivalent to another integrity metric. It produces output data [Ulinked, A, B] as evidence that the integrity metric value B is trust equivalent to integrity metric value A. To produce this evidence, the TPM is loaded with the statements SA and SB, where SA describes the integrity metric A (pubKey-A and statementID-A) and SB describes the integrity metric B (pubKey-B and statementID-B). The TPM verifies that SA is forwards linked to SB and SB is backwards linked to SA, and produces the output data [Ulinked, A, B]. The string "Ulinked" indicates the type of evidence.

TPM_upgrade_forkRoot(Uextended, A~, B~, B) creates evidence of a bifurcation from a single sequence of integrity metrics into two trust equivalent sequences, and produces output data [Ufork, A~, B~, B, B~, B]. The string "Ufork" indicates the type of evidence. The canonical representation of a Ufork data structure is [Ufork, A~, B~, B, C~, C], indicating that two PCR states [B~, B] [C~, C] are trust equivalent and derived from the same PCR state A. TPM_upgrade_forkRoot creates evidence for the state at the point of divergence, and produces the data structure [Ufork, A~, B~, B, B~, B] meaning that the two identical PCR states [B~, B] and [B~, B] are trust equivalent, which is obvious. To produce this evidence, the TPM is loaded with the data structure [Uextend, A~, B~, B]. The TPM verifies: (1) that it created the structure; and (2) that it contains the string Uextend.

TPM_upgrade_forkLink([Ufork, A~, B~, B, C~, C], [Ulinked, E, F], [branch]) causes the TPM to modify one [branch] PCR value in a set of two trust equivalent PCR values [B~, B] and [C~, C], but requires evidence that an integrity metric F is trust equivalent to the integrity metric E. If the [branch] parameter is 0 and B=E, the command extends the first PCR value [B~, B] with F to [F~, F] but the second PCR value [C~, C] is unchanged. Thus the command produces the data [Ufork, A~, F~, F, C~, C]. If the [branch] parameter is 1 and C=E the command extends the second PCR value [C~, C] with F to [F~, F] but the first PCR value [B~, B] is unchanged. Thus the command produces the data [Ufork, A~, B~, B, F~, F]. The TPM is loaded with the data structures [Ufork, A~, B~, B, C~, C], [Ulinked, E, F], [branch]. The TPM always verifies: (1) that it created both the first and second structures; (2) that the first structure contains the string Ufork; (3) that the second structure contains the string Ulinked. As previously, the string "Ufork" in the output data is the type of the evidence.

TPM_upgrade_forkExtend([Ufork, A~, B~, B, C~, C], [D]) causes the TPM to modify both branches of two trust equivalent PCR values [B~, B] and [C~, C]. The command produces the output data [Ufork, A~, X(B~, D), D, X(C~,D), D]. The TPM is loaded with the data structures [Ufork, A~, B~, B, C~, C] and the integrity metric D. The TPM verifies: (1) that it created the first structure; and (2) that the first structure contains the string Ufork. As previously, the string "Ufork" in the output data is the type of evidence.

TPM_upgrade_forkPCR([Ufork, A~, B~, B, C~, C], [PCR-index]) creates evidence that the PCR values B~ and C~ are trust equivalent for a particular PCR. The TPM is loaded with the data structures [Ufork, A~, B~, B, C~, C] and [PCR-index]. The TPM verifies: (1) that it created the first structure; (2) that the first structure contains the string Ufork; (3) that A~ is the initialisation value for the PCR with the index [PCR-index]. The TPM produces the output data [uPCR, PCR-index, B~, C~] to show that the PCR states B~ and C~ are trust equivalent values for the PCR with index PCR-index. The string "uPCR" in the output data is the type of evidence.

TPM_upgrade_forkHash([uPCR, PCR-index, A~, B~], [PCR-index, C~], [ . . . ], . . . ) creates evidence [Uhash, compHash, compHash&, PCR-indexList] that two composite PCR digests [compHash] and [compHash&] are trust equivalent for the PCRs indicated in the list [PCR-indexList]. The TPM is loaded with multiple data structures of the form [uPCR, PCR-index, A~, B~] or [PCR-index, C~]. The TPM verifies: (1) that it created any data structure of the form [uPCR, PCR-index, A~, B~]; (2) that such data structures contain the string uPCR. In this command, a data structure of the form [uPCR, PCR-index, A~, B~] indicates that the PCR with index PCR-index must be represented by the PCR value A~ in the composite hash compHash and by the PCR value B~ in the composite hash compHash&. A data structure of the form [PCR-index, C~] indicates that the PCR with index PCR-index must be represented by the PCR value C~ in both the composite hash compHash and the composite hash compHash&. The PM extracts the relevant PCR values from the input data in an order reflected in PCR-indexList and uses them to create the composite hashes compHash and compHash&. The string Uhash in the output data is the type of evidence TPM_upgrade_sea([sealedBlob], [Uhash, compHash, compHash&, PCR-indexList]) replaces the composite hash value compHash in a sealed blob [sealedBlob] with the composite hash value compHash&. The TPM is loaded with the sealed blob [sealedBlob] and [Uhash, compHash, compHash&, PCR-indexList]. The TPM verifies that it created both structures and that the second structure contains the string Uhash. If [sealedBlob] uses the same PCRs as listed in PCR-indexList and its composite hash value is compHash, the TPM replaces compHash with compHash&, and outputs the modified sealed blob.

One use of these new functions will now be described, purely as an example.

Figure 10:
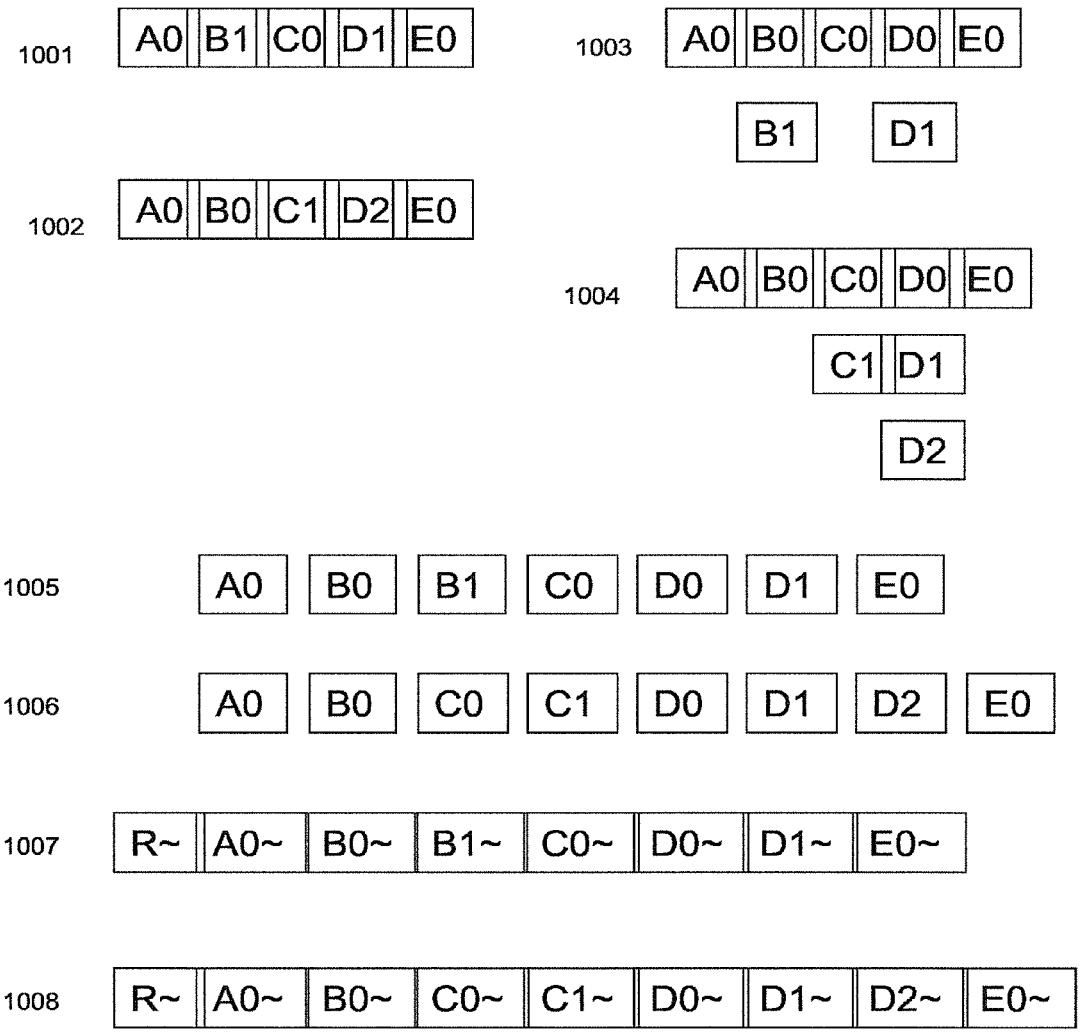
FIG. 10 illustrates configurations of two sets of integrity metrics that are trust equivalent, and resultant sets of PCR values in accordance with embodiments of the invention.

FIG. 10 illustrates two trust equivalent integrity metric sequences 1001 1002. Both these sequences are upgrades of the same integrity metric sequence A0 B0 C0 D0 E0. The first sequence 1001 has been upgraded differently than the second sequence 1002. The first integrity metric sequence 1001 is A0 B1 C0 D1 E0. The second integrity metric sequence 1002 is A0 B0 C1 D2 E0. The numbers after a letter indicates the evolution of an upgrade: integrity metric A0 is not an upgrade; integrity metric B1 is an upgrade from B0; integrity metric C1 is an upgrade from C0; integrity metric D1 is an upgrade from D0; integrity metric D2 is an upgrade from D1; integrity metric E0 is not an upgrade. These relationships are illustrated in FIGS. 1003 and 1004, where each successive column is the integrity metric for a different aspect of a trusted platform and each column illustrates the evolution of a particular integrity metric. The actual sequences of integrity metrics loaded into a PCR according to this embodiment of the invention are illustrated in FIGS. 1005 and 1006. The actual sequence of integrity metrics equivalent to the first sequence 1001 is A0 B0 B1 C0 D0 D1 E0 1005. The actual sequence of integrity metrics equivalent to the second sequence 1002 is A0 B0 C0 C1 D0 D1 D2 E0 1006. The resultant sequences of integrity metrics are illustrated in FIGS. 1007 and 1008. The actual sequence of PCR values equivalent to the first sequence 1001 is 1007 R~ A0~ B0~ B1~ C0~ D0~ D1~ E0~, where R~ is the reset state of this particular PCR. The actual sequence of PCR values equivalent to the second sequence 1002 is 1008 R~ A0~ B0~ C0~C1~D0~D1~ D2~ E0~. The requirement is to prove to a TPM that the first PCR sequence 1007 is trust equivalent to the second PCR sequence 1008. One implementation using the above functions is:

1. TPM_upgrade_extend(R~, A0)=>[Uextend, R~, A0~, A0]
2. TPM_upgrade_extend(A0~, B0)=>[Uextend, R~, B0~, B0]
3. TPM_upgrade_concat([Uextend, R~, A0~, A0], [Uextend, A0~, B0~, B0]) ⇒ [Uextend, R~, B0~, B0]
4. TPM_upgrade_forkRoot(Uextend, R~, B0~, B0)=> [Ufork, R~, B0~, B0, B0~, B0]
5. TPM_upgrade_link(B0, B1)=>[Ulinked, B0, B1]
6. TPM_upgrade_forkLink([Ufork, R~, B0~, B0, B0~, B0], [Ulinked, B0, B1], [0])=>[Ufork, R~, B1~, B1~, B0~, B0]
7. TPM_upgrade_forkExtend([Ufork, R~, B1~, B1, B0~, B0], [C0])=>[Ufork, A~, C0~, C0, C0~, C0]
8. TPM_upgrade_link(C0, C1)=>[Ulinked, C0, C1]
9. TPM_upgrade_forkLink([Ufork, R~, C0~, C0, C0~, C0], [Ulinked, C0, C1], [1])=>[Ufork, R~, C0~, C0, C1~, C1]
10. TPM_upgrade_forkExtend([Ufork, R~, C0~, C0, C1~, C1], [D0])=>[Ufork, R~, D0~, D0, D0~, D0]
11. TPM_upgrade_forkExtend([Ufork, R~, D0~, D0, D0~, D0], [D1])=>[Ufork, R~, D1~, D1, D1~, D1]
12. TPM_upgrade_link(D1, D2)=>[Ulinked, D1, D2]
13. TPM_upgrade_forkLink([Ufork, R~, D1~, D1, D1~, D1], [Ulinked, D1, D2], [1])=>[Ufork, R~, D1~, D1, D2~, D2]

14. TPM_upgrade_forkExtend([Ufork, R~, D1~, D1, D2~, D2], [E0])=>[Ufork, R~, E0~, E0, E0~, E0]
15. TPM_upgrade_forkPCR([Ufork, R~, E0~, E0, E0~, E0], P) [uPCR, P, E0~, E0~]

The structure [uPCR, P, E0~, E0~] can then be used with TPM_upgrade_forkHash to create trust equivalent composite PCR digest values. These values can then be used in TPM_upgrade_seal to upgrade the composite hash values in a sealed blob.

Preferably the existing Trusted Computing Group method of generating a composite PCR is changed to extending each subsequent PCR value into an intermediate composite PCR value. Then the command TPM_upgrade_forkHash is not required.

In a complementary approach, a further new trusted device capability creates and signs credentials containing the contents of data blobs produced by these new capabilities. Such credentials could be supplied to third parties along with evidence of current platform state (such as that created by TPM_Quote), as evidence that a platform's new state is as trustworthy as a previous state. Such credentials must include a tag, such as digestPairData, compositePairData, and so on, to indicate the meaning of the credential. Such credentials should be signed using one of a TPM's Attestation Identities, in accordance with normal practice in the Trusted Computing Group, to preserve privacy.

This approach as a whole allows a later software state (as evidenced by associated PCR values) to be associated with an earlier software state. It is therefore possible for sealed blobs to be accessed despite the change of software state, as the new PCR values can be shown to be derivable from the old PCR values and a new TPM_COMPOSITE_HASH value can replace the old TPM_COMPOSITE_HASH value. A suitable approach is simply to update all such "sealed blobs" as one step in the process of upgrading or replacing software on the trusted platform.

If a platform is such that it does not have sufficient resources to perform statement verification processes, the trusted device can be provided with capabilities that perform those verification processes. Thus new trusted device capabilities could be used by a measurement entity to verify the signature on a statement, verify a linked list of statements, etc. The trusted device could even act as a scratch pad to store intermediate results of verification processes, so the results of one verification process can be used by future verification processes without the need to storage outside the trusted device. Similar techniques are already used in Trusted Computing Group technology to compute digests and extend such digests into PCRs.

Thus far it has been assumed that trust equivalence is reciprocal: that the software represented by integrity metric A0 is equally as trustworthy as the software represented by integrity metric A1, for example. This may not always be the case. The reason for upgrading software may be to correct or improve the trustworthiness of software, in which case the software represented by integrity metric A1 may be used instead of the software represented by integrity metric A0, but the software represented by integrity metric A0 may not be used instead of the software represented by integrity metric A1, for example. It therefore becomes necessary to add extra information to the statements 701, to indicate whether trustworthiness is reciprocal. This must be included as part of the data that is signed to create the signature value 736, and reflected in the new TPM functions, so that (when necessary) the integrity metrics in one branch are always the same as the metrics in the other branch, or backwards linking to the metrics in the other branch.

In one implementation:
A reciprocalFlag field is inserted into statements 701, and set to TRUE if the previous (forwarding linking) metric is an acceptable replacement for the current (backward linking) metric, but FALSE otherwise.
The structure [Ulinked, A, B] is modified to become [Ulinked, A, B, reciprocalLink] and means that A may be replaced by B but B can only be replaced by A if reciprocalLink is TRUE.
The command TPM_upgrade_link(SA, SB) is modified to produce the reciprocalLink flag and set reciprocalLink to FALSE if [SB's reciprocalFlag is FALSE].
The structure [Ufork, A~, B~, B, C~, C] is modified to become [Ufork1, A~, B~, B, C~, C, reciprocal0, reciprocal1]. Reciprocal0 and reciprocal0 are both set TRUE by TPM_upgrade_forkRoot. Reciprocal0 is set FALSE if the first integrity set [B~, B] is ever extended during a TPM_upgrade_forkLink operation and its reciprocalLink was FALSE. Similarly, reciprocal1 is set FALSE if the second integrity set [C~, C] is ever extended during a TPM_upgrade_forkLink operation and its reciprocalLink was FALSE.
If reciprocal0 is FALSE in Ufork1 data inputted into TPM_upgrade_fork_Link, the command must fail if [branch]=1. Similarly, if reciprocal1 is FALSE in Ufork1 data inputted into TPM_upgrade_forkLink, the command must fail if [branch]=0.
The command TPM_upgrade_forkPCR is modified to inspect the flags reciprocal0 and reciprocal1 in the input Ufork structure. If those flags indicate that one PCR value may be used to unseal data that was sealed with the other PCR value, but not vice versa, the TPM orders the PCR values in the modified uPCR structure [uPCR, PCR-index, X~, Y~] so that data sealed to X~ may be unsealed with Y~.

In embodiments, this invention involves recording a linked list of statements in a TPM. We now describe aspects of embodiments of the invention related to the length of such linked lists. A record of a complete linked list is desirable to explicitly record the complete lineage of a platform's state. Unfortunately recording a complete list will increase the time needed to record integrity metrics, and increase the storage required for verification statements, either or both of which may be undesirable. It may therefore be desirable to remove older statements from a linked list, and in the limit to reduce linked lists to a single statement (the most recently linked statement).

Any arbitrary number of statements (including just one statement) can be recorded in the TPM, as long as they are contiguous members of the same linked list recorded in consecutive order. The recording process carried out by a Root-of-Trust-for. Measurement or Measurement Agent is readily adapted to the length of a list—the RTM/MA simply walks through the list, whatever its length, recording the result of the verification process in the TPM and recording the verification process in the TPM, as previously described. It remains to prove to a TPM that a shortened linked list is trust-equivalent to the original (longer) linked list. This proof depends on evidence that the start statement of a shortened list is part of a longer list. In one implementation, this involves a (previously described) [Ulinked, Slong, Sstartshort] structure, where Sstartshort is the start statement of the shortened list and Slong is some statement before Sstartshort in the longer list. This Ulinked structure is evidence that the statement Slong and Sstartshort are statements in the same linked list, and that Slong appears somewhere in the list before Sstartshort. Unless the statement Slong is contiguous with the statement Sstartshort in a linked list, generating this Ulinked structure requires a further new command (described below) to combine two Ulinked structures into a single Ulinked structure. Given the evidence [Ulinked, Slong, Sstartshort] and any arbitrary Ufork structure [Ufork, A~, B~, B, C~, C], it follows that a further legitimate Ufork structure may be derived by extending B~ with Slong and extending C~ with Sstartshort, producing the data structure [Ufork, A~, Slong~, Slong, Sstartshort~, Sstartshort]. This requires a further new command (described below). If Slong is the start of a linked list and Sstartshort is the start of a shortened version of that linked list, for example, [Ufork, A~, Slong~, Slong, Sstartshort~, Sstartshort] is evidence that a PCR (whose most recent recorded statement is the start of a first list) is trust-equivalent to another PCR (whose most recent recorded statement is the start of a shortened version of that first list). The data structure [Ufork, A~, Slong~, Slong, Sstartshort~, Sstartshort] can then be used with any command that operates on Ufork structures.

In the limiting case where only a single statement from a given list is recorded in a TPM), the functionality provided by the command TPM_upgrade_forkLink becomes redundant. The new structures previously described may be modified to omit statement values. In such a case, the Ufork structure [Ufork, A~, B~, B, C~, C] becomes [Ufork, A~, B~, C~], for example.

It was previously mentioned that a further new command may be required to combine two Ulinked structures into a single Ulinked structure. One example of that further new command is TPM_upgrade_link_concat([Ulinked, A, B], [Ulinked, C, D]). This command produces evidence that the integrity metric D is linked to the integrity metric A. The evidence takes the form of the data structure [Ulinked, A, D]. To produce this evidence, the TPM is loaded with the statements ([Ulinked, A, B] and [Ulinked, C, D]). The TPM verifies that both these Ulinked structures were created by the TPM, and verifies that B=C. Then the TPM creates the output structure [Ulinked, A, D].

It was previously mentioned that a further new command may be required to extend a first PCR value with a first statement and extend a second PCR that is trust-equivalent to the first PCR with a second statement linked to the first statement. An example of that further new command is TPM_upgrade_forkLink1 ([Ufork, A~, B~, B, C~, C], [Ulinked, E, F], [branch]) which causes the TPM to extend the [branch] PCR value with the statement E and the other PCR value with the statement F. The TPM always verifies that it created both the Ufork and Ulinked structures before producing any output. If the [branch] parameter is 0, the command extends the PCR value B~ with E to [E~, E] and the PCR value C~ with F to [F~,F]. Thus the command produces the output data [Ufork, A~, E~, E, F~, F]. If the [branch] parameter is 1, the command extends the PCR value B~ with F to [F~, F] and the PCR value C~ with E to [E~,E]. Thus the command produces the putput data [Ufork, A~, F~, F, E~, E].

We now describe, purely as an example, the upgrading of a PCR where just a single statement of a linked list is recorded in the TPM. We suppose that we are required to prove that the integrity metric sequence A0 B0 is trust equivalent to the integrity metric sequence A0 B1. This example uses modified data structures that omit statement fields, as noted above. One implementation is:
1. TPM_upgrade_extend(R~, A0)=>[Uextend, R~, A0~]
2. TPM_upgrade_forkRoot(Uextend, R~, A0~)=>[Ufork, R~, A0~, A0~]
3. TPM_upgrade_link(B0, B1)=>[Ulinked, B0, B1]
4. TPM_upgrade_forkLink([Ufork, R~, A0~, A0~], [Ulinked, B0, B1], [0])=>[Ufork, R~, B0~, B1~]
5. TPM_upgrade_forkPCR([Ufork, R~, B0~, B1~], P)=> [uPCR, P, B0~, B1~]

The structure [uPCR, P, B0~, B1~] can then be used with TPM_upgrade_forkHash to create trust-equivalent composite PCR digest values. These values can then be used in TPM_upgrade_seal to upgrade the composite hash values in a sealed blob.

Previous embodiments of this invention associated a linked list with the execution of just one program. (Even though aspects related to multiple statements in a linked list were recorded in a TPM, only one program per linked list was actually executed on the computer that hosts the TPM.) A further embodiment of this invention involves the identification of sections of contiguous statements in a linked list, accompanied by the execution in the computer of one program per statement in the section. This has the benefit of enabling the same entity to vouch for multiple programs that are executed on a platform, while maintaining trust-equivalence. Preferably the statement structure illustrated in FIG. 7 is modified to include extra data that distinguishes sections of the linked list, even if a section contains just one statement. This data could be a value that is the same for all members of the same section but different for different contiguous sections in the list, for example. This data enables the list to be parsed into sections.

When an RTM or Measurement Agent walks through a linked list and verifies statements and records the results in a TPM, the RTM or Measurement Agent can identify sections of linked list. Each statement in a section can be used to actually verify a separate program and each such program can be executed by the computer.

This permits an entity to use the same linked list to vouch for multiple consecutive programs that are executed on a platform, instead of having to create a separate linked list for each individual program.

This also permits an entity to replace a single program with multiple programs that are trust-equivalent to the single program. To do this, the entity provides a section of linked list containing a quantity of contiguous linked statements equal to the quantity of replacement programs, linked to the list associated with the original single program. The RTM or Measurement Agent in the platform verifies each statement in the section, verifies each program that corresponds to each statement in the section, records the verification results in the TPM, and executes the programs verified by those statements. The techniques previously described in relation to embodiments of this invention can then be used to guide a TPM through a proof that a platform booted with the multiple programs is trust-equivalent to a platform booted with the original single platform.

If multiple statements in the same section of linked list are used to vouch for multiple programs that are executed on a platform, the statements in that section can act as a stem for branches of separate linked lists, each branch linked to a separate statement in the section. Such branches can be used to support the execution of just one program per section of linked list, or for the execution of multiple programs per section of linked list, as just described. Thus a linked tree of statements can be created.

In a further embodiment of the invention, an entity may use a verification statement to vouch that the trust state of a platform is unchanged if a program is no longer executed on the computer platform. This approach permits trust-equivalent states to include fewer programs than previous states.

In this embodiment of the invention, the programDigests 710 field is permitted to contain a NULL indicator. An RTM or Measurement Agent should never encounter a statement containing a NULL indicator, because it implies that no associated program needs to be executed, no verification result needs to be recorded in the TPM, and no verification value needs to be recorded in the TPM. A statement containing a NULL indicator is used when a TPM is guided through the process of proving that two PCR values are trust-equivalent. The command TPM_upgrade_link(SA, SB) is modified to produce output data [Ulinked, NULL, B] if the programDigests 710 field in the statement SA contains just a NULL flag, and to produce output data [Ulinked, A, NULL] if the programDigests 710 field in the statement SB contains just a NULL flag. The command TPM_upgrade_forkLink([Ufork, A~, B~, B, C~, C], [Ulinked, E, F], [branch]) is modified so that the branch due to be updated with E is left unaltered if E is NULL, and the branch due to be updated with F is left unaltered if F is NULL.

Purely by way of example, we describe one way of guiding a TPM through a proof that a computer state before removal of a program B0 is trust-equivalent to a computer state after removal of program B0. Suppose a platform boots and generates a first set of integrity metrics [A0], [B0], [C0], [D0]. Then the platform reboots and generates a second set of integrity metrics [A0] [C0] [D0]. This second set is the same as [A0], [B1], [C0], [D0] where B1=NULL. The goal is to prove to the TPM that the first set of integrity metrics [A0], [B0], [C0], [D0] is trust equivalent to the second set of integrity metrics [A0], [NULL], [C0], [D0]. One implementation includes the sequence:
1. TPM_upgrade_forkRoot(Uextend, R~, A0~, A0)=> [Ufork, R~, A0~, A0, A0~, A0]
2. TPM_upgrade_link(B0, B1)=>[Ulinked, B0, NULL]
3. TPM_upgrade_forkLink([Ufork, R~, A0~, A0, A0~, A0], [Ulinked, B0, NULL], [0])=>[Ufork, R~, B0~, B0, A0~, A0]
4. TPM_upgrade_forkExtend([Ufork, R~, B0~, B0, A0~, A0], [C0])=>[Ufork, R~, X(B0~, C0), C0, X(A0~, C0), C0]

The rest of the proof proceeds as previous described.

Embodiments of this invention have enabled three types of upgrade:
"substitute", where one program is replaced with one trust-equivalent program
"more", where one program is replaced with more than one trust-equivalent programs
"less", where one program is eliminated but the resultant state is still trust-equivalent, In a further embodiment of this invention, an entity creating sealed data explicitly states the types of upgrade when automatic composite hash upgrade of sealed data is permitted, and data structures record indicators that show the types of integrity metric upgrade that have occurred. This permits an entity to explicitly state the types of upgrade that can cause the composite hash value in sealed data to be automatically upgraded. This is beneficial if a data owner is content to accept simple upgrade of programs but not the addition or removal of programs, or does not wish to automatically accept any upgrade, for example.

The process of sealing data, unsealing data, and guiding a TPM through the process of proving that one composite hash value is trust-equivalent to another composite hash is the same as previously described, with the following changes:
The data structures [Ufork, A~, B~, B, C~, C], [uPCR, PCR-index, A~, B~], [Uhash, compHash, compHash&, PCR-indexList] are changed to include the flags "substitute", "more", and "less".

The command TPM_upgrade_forkRoot is changed to set the "substitute", "more", and "less" flags in the output Ufork structure to FALSE.
The command TPM_upgrade_forkLink is changed so that:
when the command replaces a statement with one trust-equivalent statement it sets substitute to TRUE in the output Ufork Structure;
when the command replaces a statement with more than one trust-equivalent statements it sets more=TRUE in the output Ufork Structure;
when the command eliminates a statement it sets less=TRUE in the output Ufork Structure.
The command TPM_upgrade_forkPCR is changed so that it copies the state of the "substitute", "more", and "less" flags from the input Ufork structure to the output uPCR structure.
The command TPM_upgrade_forkHash is changed so that it copies the state of the "substitute", "more", and "less" flags in the input uPCR structure to the output Uhash structure.
The existing TCG structures TPM_STORED_DATA and/or TPM_STORED_DATA12 are modified by the addition of a new upgradeOptions field containing the flags "substitute", "more", and "less".
If upgradeOptions=>substitute is FALSE (the default value), the composite hash value in TPM_STORED_DATA_UFLAGS must not be automatically updated if 1-to-1 replacement of programs contributed to the change in composite hash.
If upgradeOptions=>more is FALSE (the default value), the composite hash value in TPM_STORED_DATA_UFLAGS must not be automatically updated if 1-to-many replacement of programs contributed to the change in composite hash.
If upgradeOptions=>less is FALSE (the default value), the composite hash value in TPM_STORED_DATA_UFLAGS must not be automatically updated if elimination of programs contributed to the change in composite hash.
The existing TCG commands TPM_Seal and TPM_Unseal and the new command TPM_upgrade_seal are changed so that they operate on the modified TPM_STORED_DATA structures.
TPM_Seal is changed to include extra input parameters "substitute", "more", and "less". The state of these extra input parameters is copied to the parameters with the same name in the output TPM_STORED_DATA structure
The operation of TPM_Unseal is unchanged.
TPM_upgrade_seal is changed so that
If upgradeOptions=>substitute is FALSE but Uhash=>substitute is TRUE, the command fails.
If upgradeOptions=>more is FALSE but Uhash=>more is TRUE, the command fails.
If upgradeOptions=>less is FALSE and Uhash=>true is TRUE, the command fails.

In a further embodiment of this invention, an entity creating sealed data can choose to force a change in the composite hash value in that sealed data. This permits the entity to explicitly approve access by upgraded programs to extant sealed data, for example. The process of sealing and unsealing data requires the following changes:
The existing TCG structures TPM_STORED_DATA and/or TPM_STORED_DATA12 are modified by the addition of a new upgradeAuth field containing a standard TCG authorisation value.

The existing TCG commands TPM_Seal and TPM_Unseal are changed so that they operate on the modified TPM_STORED_DATA structures.

The existing TCG command TPM_Seal is changed to include an extra input parameter upgradeAuth (encrypted, as usual).

The operation of TPM_Unseal is unchanged.

A new TPM command TPM_upgrade_SealForce([sealedBlob], compHash) is authorised using standard TCG authorisation protocols proving possession of the same value as upgradeAuth in the sealedBlob. The TPM opens the existing sealedBlob, replaces the existing composite hash value with the value compHash and outputs the modified sealed blob.

Automatic composite hash upgrades are not currently possible with TCG technology and some data owners may have used sealed blobs with the understanding that they could not be automatically upgraded. The TCG has stated the intention to maintain backwards compatibility whenever possible. It is therefore undesirable to allow the automatic upgrading of sealed blobs using existing commands and structures. It is preferable to create new versions of data structures and commands to implement the techniques described for embodiments of this invention. Data owners should use these new structures and commands if they wish to allow automatic upgrades, and continue to use existing structures and commands if they do not wish to allow automatic upgrades. The TCG may also wish to deprecate existing TPM_STORED_DATA structures and TPM_Seal and TPM_Unseal commands, to simply future TPMs. Therefore any new structures and commands designed to enable automatic upgrades should also enable automatic upgrade to be disabled. Data owners who mistrust some or all forms of automatic upgrade may wish to use an explicit upgrade, which inherently requires a new data structure. Therefore any new structures and commands should also enable explicit upgrades. Preferably, therefore:

- existing TPM_STORED_DATA and/or TPM_STORED_DATA12 structures are not modified as described above, but a new structure (TPM_STORED_DATA_UPGRADE, say) is created by augmenting TPM_STORED_DATA and/or TPM_STORED_DATA12 structures with the fields upgradeOptions and upgradeAuth fields.
- TPM_SEAL and TPM_Unseal are not modified as described above, but new commands are created by augmenting TPM_SEAL and TPM_Unseal with upgradeOptions and upgradeAuth fields. The new commands should operate on a TPM_STORED_DATA_UPGRADE structure.
- The commands TPM_upgrade_seal and TPM_upgrade_SealForce([sealedBlob], compHash) should operate on TPM_STORED_DATA_UPGRADE structures, only.

One example of upgrading of integrity metrics and PCR values will now be described. This occurs during the migration of a virtual platform from one host trusted platform to another host trusted platform. This example assumes that the virtual platform uses data blobs that are sealed to PCR values that represent properties of the host platform. Embodiments of this invention permits the PCR values recorded in these sealed data blobs to be upgraded in the absence of the environment in which they can currently be unsealed. Hence an advantage of use of embodiments of the invention is that a virtual platform can be customised to work on a different host platform either before or after migration to a different host platform.

If a customer is willing to trust a virtual platform, the customer should trust the entity that manages the host platform. This is because that management entity has the ability to move the virtual platform to different host platforms. It is desirable that the management entity should undertake to instantiate the virtual platform on host platforms that are equally trustworthy. This is because a rogue host platform can subvert any virtual platform that it hosts, and a virtual platform can do nothing to protect itself against a rogue host platform or rogue management entity. A customer using a virtual platform would therefore require no knowledge of the host platform—either the management entity instantiates the virtual platform on host platforms that are equally trustworthy, or it doesn't.

A third party discovers the trust properties of a platform by performing an integrity challenge and inspecting the PCR values, event log, and certificates that are returned. Information that reveals whether the platform is virtual (plus the nature of the host platform, which might itself be virtual) can be in the virtual platform's PCRs and/or can be in a virtual platform's certificates.

There is an advantage to a host management entity from putting information about a security service agreement into a virtual platform's PCR stack. The advantage is that it makes it easier to balance computing loads while maintaining agreed levels of security. Users of a virtual platform can seal their data to a PCR that indicates their agreed Security Service Level Agreement (SSLA). The less restrictive a SSLA, the larger the range of host platforms that can support the user and the easier it is for the host entity to provide service and swap a virtual platform between host platforms. If a virtual platform's actual SSLA PCR value matches a user's SLA value in a sealed data blob, the user can access his data and consume platform resources. Otherwise the user cannot. Hence if the host management entity moves a customer to a host that does not satisfy a user's SSLA, the user's data will automatically be prevented from being used in an inappropriate environment.

Factors that may be represented in an SSLA include:
Type of virtual-TPM
IP address
Uptime
Geographic location
The presence of virtual LANs
Types of virtual LANs
Whether the virtual platform can be cloned
Platform algorithm agility There is a disadvantage to a customer from putting information about the host platform into a virtual platform's PCR stack. This is because the virtual platform's PCR stack would be different to that of a dedicated (non-virtual) platform, so software configured to operate with a dedicated platform would not naturally operate on the virtual platform.

Some designers may decide to put information about host platforms in a hosted virtual platform's certificates, others may decide to put host information in a PCR on a hosted virtual platform, and others may choose to do both.

If designers put host information in a PCR on a hosted virtual platform, and users create data blobs that are sealed to those PCRs, it is desirable to upgrade those PCR values provided the properties of the destination host platform are at least equivalent to the properties of the source host platform. This can be done by use of the techniques described previously above The PCR and Integrity Metric upgrade techniques described previously are particularly advantageous because they do not require the presence of the environment currently described by the sealed data. Hence a virtual platform can be migrated to a new host and recreated when it reaches that new host, or vice versa.

One effect of the advantage to the host management entity is that the host management entity may offer preferable terms to customers using virtual platforms provided by the host management entity, provided they agree to information about the permitted instantiation of a virtual platform being present in a platform's PCR stack. Therefore, if a user's sealed data blobs always include a PCR whose value represents information about the permitted instantiation of a platform, even when a platform is a dedicated platform, the user can use the same software configurations on all platforms and take advantage of preferable terms when using virtual platforms. Naturally, the technique also permits customers to use their sealed data on different types of dedicated platform.

Figure 11:
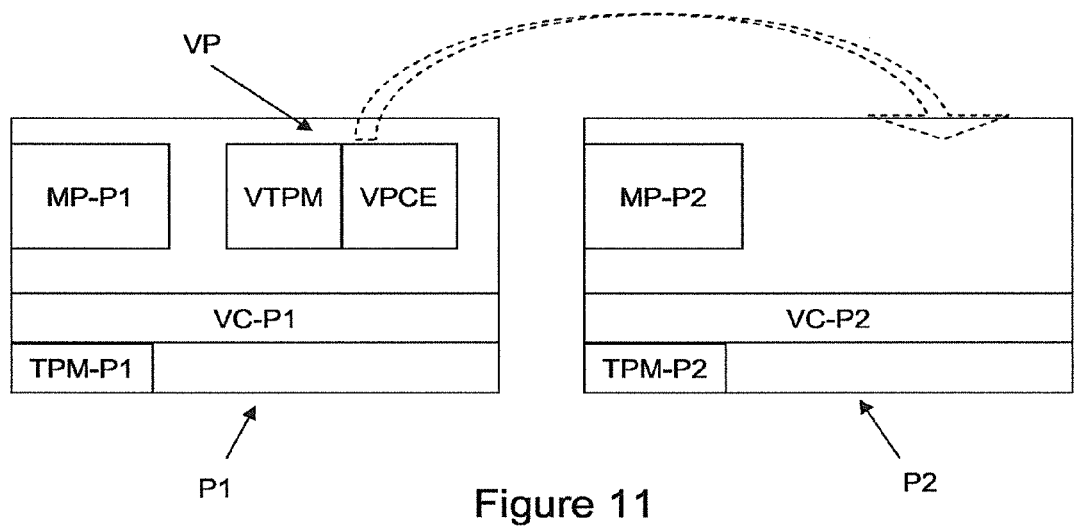
FIG. 11 illustrates schematically the migration of a virtual trusted platform from one physical trusted platform to another in accordance with embodiments of the invention.

We now describe the migration of a Virtual Platform VP from one host trusted platform P1 to another host trusted platform P2, purely as an example. The elements of the platforms shown are illustrated schematically in FIG. 11. Platform P1 may be a physical or virtual platform. Platform P2 may be a physical or virtual platform. Host platforms contain TPMs (called TPM-P1 on P1 and TPM-P2 on P2). A virtual platform VP comprises a main Virtual Platform Computing Environment VPCE and a virtual Trusted Platform Module (VTPM). At least one property of its host platform is recorded in VTPM's PCRs. The VPCE includes data blobs that are protected by VTPM and may be sealed to PCR values that depend on properties of the host platform. A host platform isolates VPCE and VTPM from each other and from other parts of the host platform. Host platforms contain a Migration Process MP (called MP-P1 on P1 and MP-P2 on P2) running in another isolated computing environment. The component in a host platform which provides isolation is the Virtualization Component (VC) (called VC-P1 on P1 and VC-P2 on P2). The PCR values in a host platform's TPM include all data needed to represent the state of its MP and VC.

Figure 12:
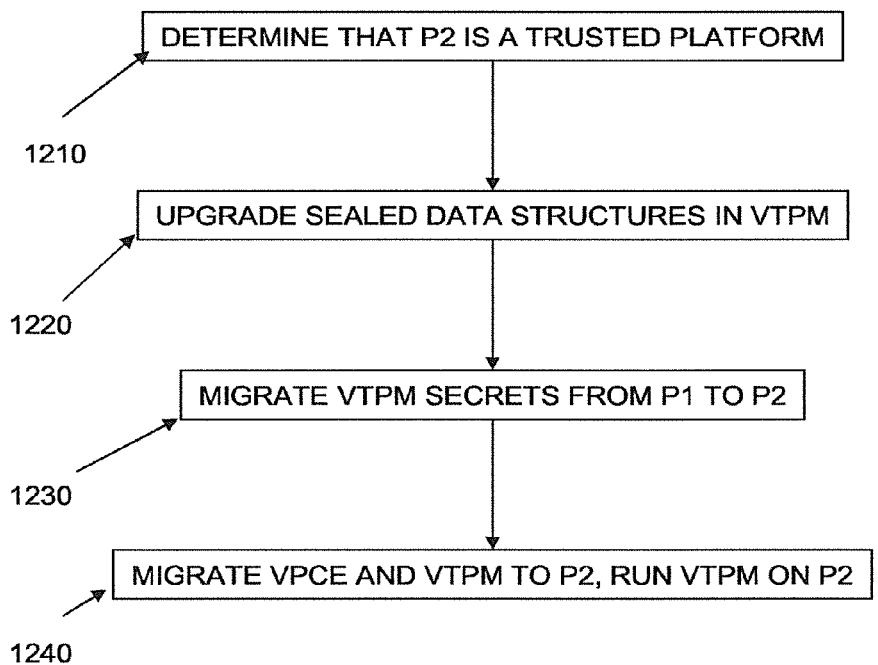
FIG. 12 illustrates a method for migrating a virtual trusted platform from one physical trusted platform to another in accordance with embodiments of the invention.

VP is initially instantiated on P1. When VP needs to be migrated (upon request of a user or as a maintenance operation from the provider), the Migration Process MP-P1 first suspends the execution of VPCE on P1 and then suspends the corresponding VTPM. While suspension of VPCE might not require any additional steps, suspension of VTPM must ensure that any secrets VTPM-Secrets used by VTPM are removed from memory and protected by TPM-P1. MP-P1 then migrates VP from P1 to P2 by performing the following steps, as illustrated in FIG. 12:

1) Check (1210) that the destination platform P2 is a suitable genuine trusted platform, and obtain one of its Attestation Identity Keys If MP-P1 does not already trust P2 and know one of its TPM keys, P1 uses a Challenge-Response protocol with P2 to determine if P2 is a legitimate trusted platform (i.e whether TPM-P2 and the construction of P2 are trusted by MP-P1). This challenge-response process provides MP-P1 with evidence that P2 is a particular type of genuine trusted platform and details of a particular TPM key of P2.

2) Upgrade (1220) Integrity Metrics in the sealed blobs protected by VTPM

If a property provided by P2 is equivalent to (or a superset of) a host property recorded in PCR values in individual data blobs sealed to the VTPM, MP-P1 upgrades those individual VTPM sealed blobs, creating new sealed blobs that include PCR values that indicate the property offered by P2. This may or may not require explicit authorization from an upgrade entity associated with a sealed blob, depending on the upgrade method.

3) Migrate (1230) VTPM-Secrets from P1 to P2

MP-P1 executes a migration command from TPM-P1 to TPM-P2 on VTPM-Secrets and sends the resulting data to MP-P2. MP-P2 finishes the migration process by providing the received data to TPM-P2. Standard TCG techniques are used to ensure that VTPM-Secrets are unavailable in P2 unless P2 is executing the desired version of MP-P2 and VC-P2.

4) MP-P1 sends (1240) the data representing VPCE and VTPM to P2 (and MP-P2 runs VTPM).

MP-P2 uses this data to create an identical instance of VP on P2 by creating an instance of VPCE and VTPM. MP-P2 then resumes VTPM execution. Upon resume, VTPM tries to reload VTPM-Secrets into memory. Failure to do so indicates an unacceptable VP environment on P2. If reload is successful, MP-P2 resumes VPCE which can now use the VTPM and access secrets protected by VTPM as they were on P1. Finally, applications on the VP attempt to unseal data stored in sealed blobs protected by VTPM. Failure indicates that P2 is unsuitable for revealing that particular sealed data.

Note that steps 2 and 3 could be executed in the opposite order, in which case the VTPM-sealed blobs are migrated to P2 before being upgraded on P2.

The methods described above can obviously be applied and adapted to the upgrading of any data structure that contains integrity metrics or is derived from integrity metrics. Such methods can be used to provide evidence that one integrity metric is trust equivalent to another integrity metrics, that one PCR value is trust equivalent to another PCR value, and that one PCR_COMPOSITE value is trust equivalent to another PCR_COMPOSITE value. These methods can hence be used to upgrade arbitrary data structures that depend on integrity metrics, PCR values and PCR_COMPOSITE values. Some examples of other data structures that could be upgraded are TCG structures that depend on PCR_COMPOSITE values, such as the TCG key structures TPM_KEY, TPM-KEY12 and their ancillary structures. A TPM command analogous to TPM_upgrade_seal could be used to upgrade the PCR_COMPOSITE value in a TPM-KEY structure, for example. Upgrading of key structures may for example be desirable when an original environment is unavailable, when data is recovered from backups, or when it is duplicated on different systems. In particular, migratable keys may be used to facilitate backup and recovery, and for duplication of data (on different platforms or on different operating systems). Current TCG key migration commands such as TPM_CreateMIgrationBlob and TPM_CMK_CreateBlob explicitly ignore PCR_COMPOSITE values. Hence TCG trusted platform technology may benefit from methods described in embodiments of this invention to change the composite-PCR values in TPM key structures.

The invention claimed is:

1. A method of providing an upgrade or replacement for identified software, comprising:
   determining for the upgrade or replacement a statement indicating the nature of the identified software;
   verifying that the upgrade or replacement is as trustworthy as the identified software,
   wherein the verifying comprises identifying the statement as part of a linked list of statements relating to the identified software, and determining that the linked list is a valid linked list, wherein the linked list of statements is linked forward by signature values using private keys, and is linked backwards by digests; and
   providing the upgrade or replacement with the statement.

2. A method as claimed in claim 1, wherein the statement comprises a flag indicating that a forward linking integrity metric is an acceptable replacement for a backward linking integrity metric.

3. A computer platform, comprising:
a processor; and
a set of machine-readable instructions embodied on a memory to be executed by the processor, the set of machine-readable instructions including:
  a statement indicating a type of data structure of the set of machine-readable instructions; and
  a proof that two or more instances of the data structure type are as trustworthy as each other, wherein the proof comprises an identification of the statement as part of a linked list of statements relating to the data structure type,
wherein the statement includes a flag to indicate that a forward linking integrity metric of at least one of the instances is an acceptable replacement for a backward linking metric of another one of the instances.

4. The computer platform as claimed in claim 3, wherein the set of machine-readable instructions further comprises a digest, or data derived from a digest, of at least one of the instances of the data structure type.

5. The computer platform as claimed in claim 3, wherein the machine-readable instructions contain no digest, or data derived from a digest, of at least one of the instances of the data structure type.

6. The computer platform as claimed in claim 3, comprising a second set of machine-readable instructions, wherein the data structure type of the set of machine-readable instructions and the second set of machine-readable instructions have the same data structure type and proof that two or more instances of the same data structure type are equally trustworthy.

7. The computer platform as claimed in claim 3, wherein the data structure type is software of equivalent functionality.

8. The computer platform as claimed in claim 3, wherein the data structure type is a key.

9. A method of providing an integrity metric on a computing platform comprising a trusted device protected from subversion, the method comprising:
measuring, for a set of machine-readable instructions, at least a first and last statement in an entire linked list of statements; and
recording the measurement in the trusted device,
wherein the trusted device comprises platform configuration registers into which measurements are placed by concatenating a current platform configuration register value with measurement data, hashing the result and replacing the current platform configuration register value with the hashed result, and wherein the trusted device is to establish that one sequence of platform configuration register values is trust equivalent to another sequence of platform configuration register values.

10. A method as claimed in claim 9, further comprising providing a partial linked list of the linked list of statements and demonstrating that the partial linked list is trust equivalent to the entire linked list of statements.

11. A method as claimed in claim 9 further comprising separately recording a verification that two or more instances of the machine-readable instructions are equally trustworthy.

12. A method of vouching for software used by a computing platform, comprising:
requesting an indication of the software used by the computing platform from the computing platform;
receiving, from the computing platform, a statement vouching for a plurality of software, the statement comprising an indication of trustworthiness of the plurality of software used by the computing platform, the indication comprising a structure of digests of the plurality of software vouched for by the statement or a digest of a structure comprising digests of the plurality of software vouched for by the statement.

13. A method as claimed in claim 12, further comprising providing a second statement, wherein the second statement comprises the indication of trustworthiness of the plurality of software used by the computing platform and excludes any digest.

14. A method for a computing platform to report software state disposed on the computing platform, comprising:
receiving, by the computing platform, a request for an indication of the software disposed on the computing platform; and
providing, by the computing platform, an indication of trustworthiness of a software type of machine-readable instructions disposed on the computing platform, the indication of trustworthiness attested by a software provider and verified by the computing platform.

15. A method as claimed in claim 14, comprising preserving a type of the machine-readable instructions by providing a plurality of digests, or derivatives of digests, of instances of the type.

16. A method as claimed in claim 14, comprising preserving a type of the machine-readable instructions by providing no digests, or other material directly derived from instances of the type.

17. A method of migrating a virtual trusted computing platform from a first trusted computing platform to a second trusted computing platform, each trusted computing platform comprising a trusted device protected against subversion to measure aspects of a computing environment associated with each trusted computing platform, and wherein the virtual trusted computing platform comprises a virtual trusted device and a virtual computing environment from which the virtual trusted device is protected, trust in the virtual trusted platform being rooted in the trusted device of the trusted platform hosting the virtual trusted platform, the method comprising:
determining by the first trusted computing platform that the second trusted computing platform is a trusted computing platform;
updating data structures of the virtual trusted platform with properties of the second trusted computing platform;
migrating secrets of the virtual trusted platform from the first trusted computing platform to the second trusted computing platform; and
transferring the virtual trusted platform to the second trusted computing platform and resuming operation of the virtual trusted platform.

18. A method as claimed in claim 17, wherein at least one of the first trusted computing platform and the second trusted computing platform is a virtual trusted computing platform.

* * * * *

UNITED STATES PATENT AND TRADEMARK OFFICE
CERTIFICATE OF CORRECTION

PATENT NO. : 9,111,119 B2
APPLICATION NO. : 13/779400
DATED : August 18, 2015
INVENTOR(S) : Proudler et al.

Page 1 of 1

It is certified that error appears in the above-identified patent and that said Letters Patent is hereby corrected as shown below:

In the claims

Column 28, line 20 Claim 14, delete "state disposed" and insert -- disposed --, therefor.

Signed and Sealed this
Eighth Day of March, 2016

Michelle K. Lee
*Director of the United States Patent and Trademark Office*